Feb. 24, 1953     T. W. ZOBEL     2,629,283
INTERFERENCE SCHLIEREN APPARATUS OF UNUSUALLY LARGE DIMENSIONS,
HAVING MEANS FOR IMPROVING THE INTERFERENCE QUALITY
BY SELECTIVE ONE POINT DEFORMATION OF THE
REFLECTING ELEMENTS OF THE DEVICE
Filed March 13, 1951
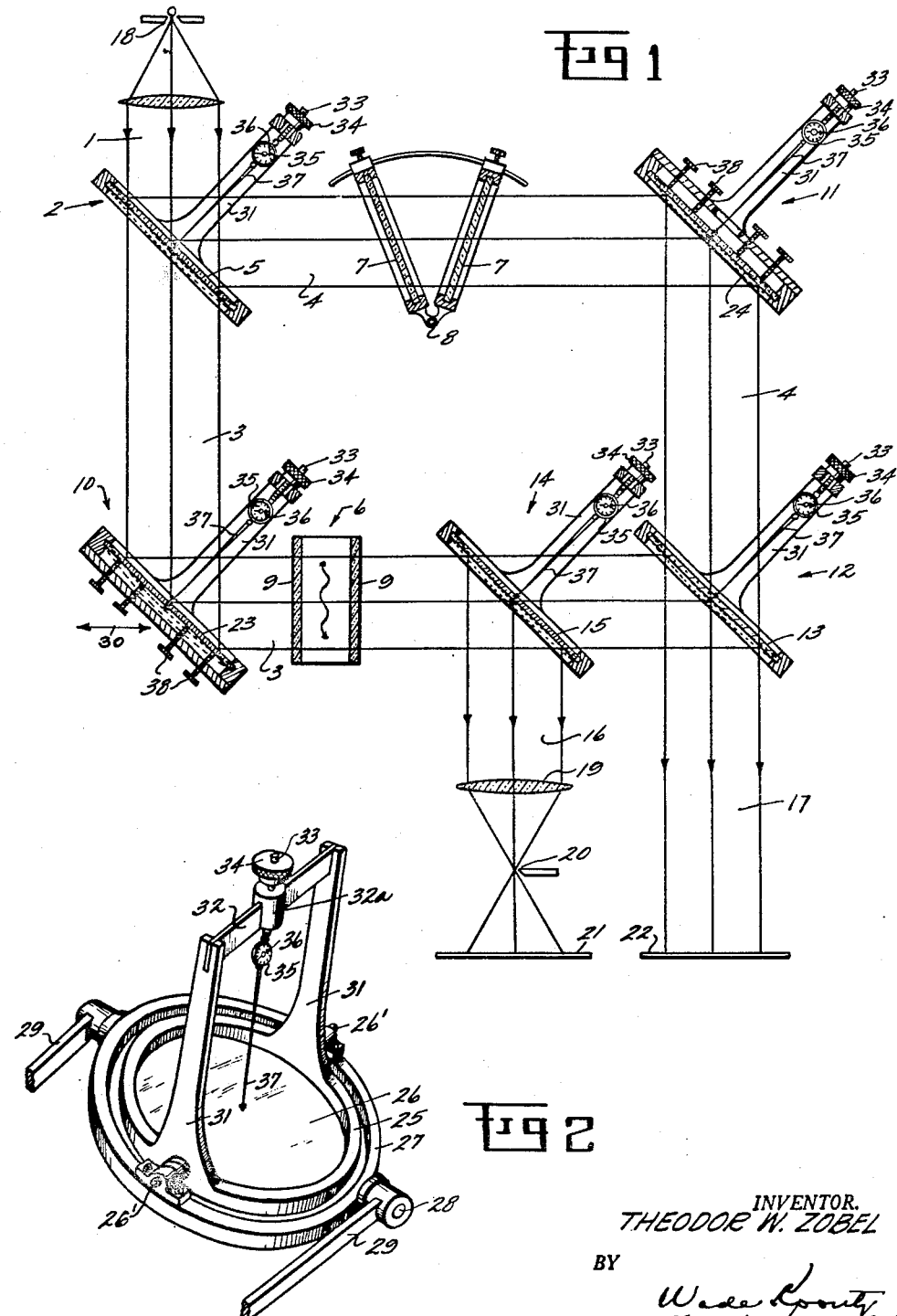
INVENTOR.
THEODOR W. ZOBEL Patented Feb. 24, 1953

2,629,283

UNITED STATES PATENT OFFICE 2,629,283

INTERFERENCE SCHLIEREN APPARATUS OF UNUSUALLY LARGE DIMENSIONS, HAVING MEANS FOR IMPROVING THE INTERFERENCE QUALITY BY SELECTIVE ONE POINT DEFORMATION OF THE REFLECTING ELEMENTS OF THE DEVICE

Theodor W. Zobel, Dayton, Ohio

Application March 13, 1951, Serial No. 215,366

7 Claims. (Cl. 88—14)

(Granted under Title 35, U. S. Code (1952), sec. 266)

The invention described herein may be manufactured and used by or for the United States Government for governmental purposes without payment to me of any royalty thereon.

It is known that interference apparatus belongs to the group of optical instruments which represent optical components of the highest quality. Good instruments using the Mach-Zehnder four-plate system should show only a maximum deviation from straightness of the final interference fringes of about one-quarter fringe, having an adjustment for finite width of fringes. Since the final interference pattern is the result of all four optical components, each reflecting surface must have at least an accuracy which corresponds with the accuracy of the final pattern, if no compensating effect within the four-plate system is assumed. This means that the accuracy of each single plate, when measured with an absolutely flat comparison plate would be one-eighth $\lambda$, $\lambda$ being the wave length of the light used, when the surface shows a deviation from straightness of one-quarter fringe, having an adjustment of the test arrangement from finite width of fringes. This deviation includes also that this slight curvature is uniform. In other words, using an adjustment for finite fringe width, pure ring-shaped patterns must appear in the surface. The maximum displacement in the center of such a plate is then:

$$\tfrac{1}{8}\lambda = \tfrac{1}{8} \times \tfrac{1}{2000} \text{ mm., or } \tfrac{1}{16{,}000} \text{ mm., or } \tfrac{1}{406{,}000} \text{ inch}$$

This order of accuracy is much greater than the highest accuracies which are used in all mechanical work, also this accuracy in the surface of optical plates and mirrors is almost the best that can be obtained at all in small plates (up to 10 inches diameter) where the flexibility of the plates can be completely ignored. This surface accuracy, mentioned above, can also be expressed in the "radius of curvature" of the surface.

Where unusually large interference apparatus are concerned the allowed accuracy of the surface must be held the same as on the small ones; in other words, the displacement in the center of the plate must be the same for the small as well as for the large interference plates, also the number of interference fringes in the entire area must remain the same. In other words the radius of curvature of the large plate surfaces must be increased materially over the radius of curvature of the smaller plates. The theory prescribes that the number of fringes increases with the square of the enlargement if the curvature of the reflecting surface remains the same. If an interferometer apparatus is to be built which is four times larger than the small one, the accuracy of each single surface must be sixteen times higher than before, if the surface pattern of each plate is to be the same for both sizes.

It can be understood that the technique to grind and polish plate surfaces with the best possible care can not be improved the sixteen times higher required amount very easily and if it is possible at all it would be extremely difficult and very expensive. Concerning the relative prices for interferometer plates it could be stated approximately that starting with the cost of plates having a maximum number of fringes of between 100 and 10 the cost goes up about double when the fringe limit is reduced from ten to five fringes. A reduction from five to one fringe more than doubles the cost again, while a reduction from one to one-quarter fringe raises the cost much more rapidly to an unknown but extremely large amount, if very large plates of such accuracy can be made at all. The four plates required, of course, quadruple this very high expense.

Therefore it becomes important to devise some means whereby the optical or interference qualities of interferometer apparatus can be improved to a degree equal to the results obtained with the extremely high quality (low fringe number) plates mentioned above, using good quality plates of large sizes but not possessing such extremely low fringe number requirements, to thereby maintain the cost of the interferometer apparatus within a reasonable figure, normally required for apparatus having lower interference quality.

In my former patent application (to Theodor W. Zobel) filed May 19, 1947, Serial No. 749,071, for Interference Device for Evaluating Interference Phenomena Over a Large Surface, Patent Number 2,555,387 dated June 5, 1951, it was contemplated in a large interference apparatus that the mirror plates could be deformed so as to improve their optical flatness by utilizing a frame for supporting the plates rigidly at their edges and providing adjusting means in the backs of the mirrors and carried by the frame intermediate the periphery of the mirrors, for adjusting localized areas of the mirrors in order to bring the combined light rays of the comparison and measuring beams into finer parallelism in the interference beam. This arrangement could not be used for the beam splitter plates since the adjusting means would be an obstruction in the path of the light beams passing through these partially transparent plates.

In the present invention it is proposed to adjust and improve the surface contour of not only the full mirrors but also to improve the flatness of all of the interferometer plates by a very simple expedient. While deformations of localized areas may be desirable, as disclosed in the patent application just mentioned, it has been determined that almost the entire effect of the deformation of a large plate of usable optical quality, to improve the interference pattern, can be accomplished by a controlled slight movement of the center portion of the plate. The invention therefore comprises an interferometer and Schlieren apparatus having means for deforming the reflecting and beam splitter plates by adjusting the reflecting surface contours thereof from a force applied at the centers of the plates.

A further object of the invention is the utilization of the adjusting means for applying a predetermined force to the centers of the partially transparent reflecting plates, perpendicular to the plate surfaces, without materially obstructing the light beam passing through the plates, where the plates are used in interferometers as the partially transparent beam splitter plates.

Another object is the provision of force measuring means incorporated in the actuating connection to the center of the plates, whereby the force or tension required to adjust the plate contours to the desired flatness or curvature can be measured and determined.

Other objects and advantages of the invention will become apparent from the following description and accompanying drawings in which like reference characters refer to like parts in the several figures.

*Drawings*

Fig. 1 is a schematic plan view of a combined interference and Schlieren apparatus incorporating my invention.

Fig. 2 is a perspective view of one of the reflector plate elements, more clearly illustrating the adjusting elements and the mounting gimbal means therefor including my improved tensioning and force measuring means.

Referring to Fig. 1 the reference numeral 1 denotes a beam of collimated light, preferably monochromatic. The beam is produced by a light source having the usual light aperture, the light passing through the aperture, or an elongated aperture or slit when a Schlieren image is desired, to produce the initial collimated light beam 1.

The reference numeral 2 indicates generally the first beam splitter plate device which splits the initial collimated beam 1 to form the measuring and comparison light beams 3 and 4, the measuring beam 3 passing through the beam splitter device 2 while the comparison beam 4 is reflected by the partially transparent reflecting surface 5 of the plate 2 as indicated in the drawings. The measuring and comparison beams 3 and 4 traverse separate diverging paths, a test section 6 being interposed in the measuring beam 3 while a pair of transparent compensator plates 7, 7 hinged together at 8, are interposed in the comparison beam 4 and are adjustable in the beam, to compensate for the change in the optical length of the measuring beam 3 due to its passage through the transparent window plates 9 at opposite sides of the test section 6.

A pair of full mirror devices 10 and 11 are inclined across the two diverging partial beams 3 and 4 for reflecting the two beams 3 and 4 across each other at equal distances from the reflecting surface 5 of the beam splitter plate device 2.

A second beam splitter plate 12, having a partially transparent reflecting surface 13, is inclined across the intersection of the two partial beams 3 and 4.

The interferometer part of the above arrangement comprises a conventional interferometer apparatus of the four plate Mach-Zehnder type. In the combined interference-Schlieren device the third beam splitter plate device 14 is positioned in the measuring beam 3, having a partial transparent reflecting surface 15 for reflecting a portion of the measuring beam 3 to produce the Schlieren beam 16. The beam splitter plate device 12 reflects the balance of the measuring beam 3 in parallel relation to the Schlieren beam 16, in combined relation to the comparison beam 4 passing through the partially transparent reflecting surface 13, forming the combined or interference beam 17. Suitable optical devices, such as conventional cameras, lenses, and viewing screens, are placed in the path of the Schlieren and interference beams 16 and 17, such as the lens 19, the Schlieren knife edge 20 disposed at the focal point of the lens 19 in optically parallel relation to the light aperture slit in front of the concentrated light source 18, a viewing screen, or sensitized surface 21 being provided to receive the Schlieren beam image, a screen 22 being also provided in the interference beam 17 for receiving and viewing the interference image in adjacent spaced relation to the Schlieren image on the screen 21.

Referring more specifically to the apparatus illustrated for carrying my invention into effect, each of the reflecting elements 2, 10, 11, 12 and 14 of the basic interferometer device is provided with an adjusting mechanism, one of which is shown in detail in Fig. 2. Each of the front surfaced full plane mirrors 23 and 24 of the reflector devices 10 and 11, and the partially transparent mirrors of the beam splitter devices 2, 12 and 14 is mounted in an annular frame 25 as shown in Fig. 2 which rigidly engages and supports the periphery of the mirror or beam splitter plate 26, as the case may be, preventing bodily movement of the reflecting element. The mirror, or plate, as shown in Fig. 2 is indicated at 26, conventional means being provided in a conventional manner for tilting the mirror frame 25 universally, and means may be provided for bodily adjustment or longitudinal displacement of the mirror device in the interferometer to adjust the optical distance of the beams. Each of the mirror frames 25 comprises an inner gimbal frame which is pivoted for tilting movement on pivots 26' in an outer gimbal frame 27. The outer gimbal frame 27 is pivoted, for tilting movements at 28 in a plane transverse to the axis of the pivots 26', on a main frame 29 which is rigidly mounted on the main support or bed of the interferometer apparatus.

Referring briefly to Fig. 1, at least one of the main frames, such as the frame 10 (29 in Fig. 2), is mounted for longitudinal movement on the bed of the interferometer, for instance, in the direction indicated by the arrow 30 so as to provide an initial equalizing adjustment for the relative physical lengths of the measuring and comparison beams 3 and 4. This adjustment is also conventional. Each of the inner gimbal members 25 of the mirror and reflector devices 2, 10, 11, 12 and 14 is provided with a pair of rigid upstanding arms or standards 31, projecting away from the opposite side of the gimbal ring 25 preferably in parallel relation, to a point beyond the confines of the light beam which is reflected by the mirror or partially transparent plate 26, the outer ends of the two arms 31 being connected together by a flat cross bar 32. At the center of the cross bar 32 is a cylindrical sleeve member 32a through which an adjusting screw or threaded shaft 33 extends. An adjusting nut 34 is threaded onto this screw shaft 33 and bears against the outer end of the cylindrical sleeve member 32a. A force or tensioning measuring device, such as a spring balance or scale 35 is secured to the other end of the screw shaft 33, the scale device comprising a casing which is preferably secured to the end of the threaded shaft 33, and has an actuating stem 37 which actuates the pointer 36 to indicate the amount of tension which is applied to the stem or tension rod 37. The lower end of the slender rod 37 is connected to the reflector plate or mirror 26, this connection being at the center of the reflector or mirror 26 and comprising any suitable type of securing means. The securing means may comprise a small eyebolt passing through an aperture in center of the plate 26, with a ring at one end to which the tension rod 37 is secured.

Unusually large mirrors and interferometer plates are often used in inclined positions, their own weight causing them to bend such a degree of curvature as to exceed the maximum number of fringes of "Newton" rings allowed for these plates. By adjustment of the nuts 34 tension on the rods 37 may be applied or increased to bring the reflecting surfaces of the reflector plates to their best planes of optical flatness. This adjustment may be accomplished while the apparatus is in operation, noting the improvement in the interference phenomena on the screen 22 as the nuts 34 are tightened (or loosened). When the best adjustment is made the amount of tension required can be noted on the scale device 35, so that substantially the same required tension can always be applied to the centers of these plates to produce the lowest number of interference fringes on the screen 22 without too much experimentation.

The full mirrors of devices 10 and 11 may also be provided with localized individual adjustment screws 38, carried by the backs of the full mirror supporting frames 25, their inner ends in cooperative actuating engagement with the backs of the full mirrors in localized zones disposed around the central tensioning stem or rod 37. The ends of the screws 38 may also be secured to the back surfaces of the full mirrors by some universal connection such as shown in the aforementioned patent application, so that the compression or tension stresses may be applied to the localized areas by rotative movement of the screws 38 in one direction or the other to limit movement in each of the zones.

The tensioning or adjusting rods 37 and the standards 31 are all arranged in the interferometer in a similar manner so that the standards or arms 31 project away from the splitter plates and full mirrors in the same general direction, perpendicular to the general plane of the full mirror and partially transparent reflecting surfaces of the reflecting devices. This arrangement eliminates the requirement for adjusting the centers of the plates and mirrors in both directions, also the tension and adjustment is applied to all of the plates in opposition to their natural bending tendency under their own weights.

Assuming that the full mirrors have been adjusted to bring their reflecting surfaces into the best possible optically flat planes by adjustment of the adjusting screws 38 and the central one point tensioning adjustment, the scale 35 can be observed during the adjustment to determine the approximate tension required to bring the other respective full mirrors to their maximum planes of flatness. By applying approximately the same tension to the rods 37 connected to the beam splitter plates of the beam splitter devices 2 and 12 the contour of the transparent reflecting surfaces 5 and 13 can be corrected to eliminate any slight uniform surface curvature and the sagging of the plates under their own weight.

With the light source turned on the interference fringe pattern should now be visible on the screen 22 and by subsequent fine selective adjustments of the nuts 34 on the threaded stems 33 of the beam splitter devices 2 and 11, and a possible adjustment of one or the other or both of the nuts 34 on the tension means for the full mirror reflector devices 10 and 11, the interference fringes can be reduced to a minimum number, making the apparatus equal in optical quality to a much finer interferometer having optical quality and flatness of plates with a much lower minimum fringe limit, without the high initial accuracy and cost of the finer apparatus.

Since the tension rods 37 can be made very small in diameter and of high quality steel, or suitable strong material, they will not materially obstruct the light beams striking or passing through the plates, other than to produce a single fine line shadow in the final interference image or picture on the screens 21 or 22. The frame members 31 are disposed at opposite sides of the light beams and are therefore not in the light path. They extend rearwardly a distance in excess of the width of the light beams so as to dispose the scale members 35, and the supporting lateral projections or cross bars 32 out of the light beams.

The distance from the center of the test chamber 6 to the reflecting surface 13 of the splitter plate 12 is approximately equal to the distance from the reflecting surface of the full mirror 24 to the splitter plate surface 13, this being conventional to produce a clear outline or silhouette image of the test piece in the test section. Angular adjustment of the transparent compensator plates 7, 7 afford a fine adjustment of the relative optical lengths of the measuring and comparison beams 3 and 4, also compensating for the passage of the beam 3 through the windows 9, 9 of the test section.

It is to be understood that various modifications and changes may be made in the detailed arrangement shown and described without departing from the spirit and scope of my invention, and I desire to be limited only within the scope of the pending claims.

I claim:

1. In an interferometer apparatus of the four plate type having a light source, means for producing an initial light beam from the light source, a first beam splitter plate having a partially transparent reflecting surface interposed in the initial light beam for splitting the beam to form a partial beam passing through the splitter plate and a second diverging partial beam reflected by the plate, forming measuring and a comparison beams traversing separate light paths, full mirror means in the path of each of the measuring and comparison beams for reflecting the same across each other at equal optical distances from the partially transparent reflecting surface aforesaid, and a second beam splitter plate having a partially transparent reflecting surface interposed across said measuring and comparison beams at their point of intersection for passing the rays of one of the last mentioned partial beams through the plate and reflecting the rays of the other partial beam in coincident parallel relation to form the interference beam; supporting and adjusting means for each of the plates, one of the supporting means comprising a rigid supporting frame having means engaging and rigidly supporting the periphery of one of the plates against bodily displacement, an arm projecting from the supporting frame at one side of the plate and at one side of the beam reflected by the plate, said arm terminating in a laterally projecting support extending over the center of the plate in a greater spaced relation from the reflecting surface of the plate than the width of the light beams passing through or reflected by the plate, a single elongated actuating connection secured at one end to the central position of the plate and secured at its other end to the laterally projecting support, above the center of the plate, and tensioning means in said connection for applying tension to said actuating connection to adjust the center portion of the plate relative to its periphery to adjust the light rays in one of the partial beams relative to the light rays in the other partial beam to improve the parallel relation of said rays when combined in the interference beam.

2. In an interferometer apparatus having a light source, means for collimating light from the light source to form a collimated light beam, a beam splitter plate inclined across said collimated light beam for splitting the beam to form relatively diverging measuring and comparison partial light beams, full mirror means in each of the diverging partial light beams for reflecting said partial light beams across each other at similar optical distances from the beam splitter plate, a second beam splitter plate interposed in the path of said partial light beams at their point of intersection for combining the partial beams to produce the interference beam, rigid supporting means for the splitter plates and the full mirrors, at least one of said supporting means comprising a frame engaging and rigidly supporting the peripheral edge portion of one of the beam splitter plates, a rigid supporting arm extending from the frame at one side of the last mentioned splitter plate to a point located over the center of the splitter plate at a distance from the splitter plate equal to at least the width of the partial light beam reflected by the splitter plate, a single elongated tensioning member connected at one end to the center of the splitter plate, and tensioning means connected between the other end of the elongated tensioning member and the supporting arm at said point.

3. Apparatus as claimed in claim 2, including tension measuring means connected to the elongated tension member for measuring the amount of tension applied through the elongated tension member to the center of the splitter plate.

4. In an interferometer apparatus of the four plate type including a pair of beam splitter plate members disposed in parallel relation at opposite corners of a parallelogram and a pair of full mirror members disposed parallel in the remaining opposite corners, means for projecting a collimated light beam through one of the splitter plates parallel to one adjacent side of the parallelogram, said splitter plates and mirror members each comprising a rigid supporting frame extending around the periphery of the plate or mirror periphery to support the plate or mirror rigidly therein at its periphery, supporting arm members projecting from said frames in perpendicular relation to the reflecting surfaces of the plates and mirrors, exteriorly of their peripheries, and in the same direction relative to each other, said arm members each having a laterally extending portion projecting over the central portions of the plates and mirrors, tension measuring means connected to each of said laterally extensioning portions above the centers of each of the plates and mirrors, an elongated tensioning stem member connected at one end to the center of each of the plates or mirrors and at its opposite end to one of the tension measuring means, and tension applying means intermediate the tension measuring means and the laterally extending portions for applying predetermined tension to the stem members.

5. In an interferometer device having a beam splitter plate member for splitting a collimated light beam to form diverging partial light beams, one of said partial light beams traversing a test medium; full mirror members positioned in each partial beam for reflecting the beams across each other in intersecting relation; a second beam splitter plate member interposed across the partial beams at their point of intersection to combine the beams to form the interference beam; at least one of said members comprising an annular supporting frame including an disk-shaped mirror having a peripheral edge secured in the frame; arm members projecting from the frame in the same direction at opposite sides of the periphery of the mirror, said arm member terminating in a rigid crossbar connecting the ends of the arm members together and extending across the center of the mirror in spaced relation to the mirror, adjustable tensioning means movably carried by the cross bar and located above the center of the mirror, adjustable toward and away from said mirror center; and tensioning rod means connected at one end to the center of the mirror and at its opposite end to the adjustable tensioning means, for adjusting the surface contour of the mirror while the mirror is supported rigidly in said frame against bodily displacement.

6. Apparatus as claimed in claim 5, including tension measuring means interposed in the adjustable tensioning means for measuring the tension applied to the mirror center during the tensioning thereof.

7. Apparatus as set forth in claim 5 in which the first and second mentioned beam splitter plate members are inclined across the light beams in approximately parallel relation, each member comprises an annular rigid supporting frame rigidly engaging and supporting the plate around its periphery, rigid arm members projecting from both of the annular frames in the same general direction at opposite sides of splitter plate periphery to a point located over the center of splitter plate in that frame and spaced from the plate at a distance at least equal to the diameter of the light beams that are split and combined by the respective first and second splitter plate members, adjustable tensioning means connected between the arms at said points and the centers of the splitter plates, whereby the reflecting surfaces of the splitter plates are adjustable relative to each other to improve their surface contour while supporting the plates rigidly against bodily displacement at their peripheries in the interferometer apparatus, to improve the parallel relation of the measuring and comparison beams in the interference beam.

THEODOR W. ZOBEL.

REFERENCES CITED

The following references are of record in the file of this patent:

UNITED STATES PATENTS

| Number | Name | Date |
|---|---|---|
| 1,044,502 | Crehore et al. | Nov. 19, 1912 |
| 1,140,576 | Conrady et al. | May 25, 1915 |

FOREIGN PATENTS

| Number | Country | Date |
|---|---|---|
| 7,232 | Switzerland | Aug. 20, 1893 |